(12) United States Patent
Grampassi

(10) Patent No.: US 8,887,522 B2
(45) Date of Patent: Nov. 18, 2014

(54) APPARATUS FOR DISPENSING A FOOD PRODUCT

(75) Inventor: Enrico Grampassi, Spilamberto (IT)

(73) Assignee: S.P.M. Drink Systems S.p.A., Spilamberto (MO) (IT)

( * ) Notice: Subject to any disclaimer, the term of this patent is extended or adjusted under 35 U.S.C. 154(b) by 257 days.

(21) Appl. No.: 13/502,246

(22) PCT Filed: Oct. 21, 2010

(86) PCT No.: PCT/IB2010/054773
§ 371 (c)(1),
(2), (4) Date: Jun. 15, 2012

(87) PCT Pub. No.: WO2011/048568
PCT Pub. Date: Apr. 28, 2011

(65) Prior Publication Data
US 2012/0240611 A1 Sep. 27, 2012

(30) Foreign Application Priority Data
Oct. 22, 2009 (IT) .............................. MO2009A0259

(51) Int. Cl.
*A23G 9/00* (2006.01)
*B67D 7/80* (2010.01)
*B67D 3/00* (2006.01)
*A23G 9/04* (2006.01)
*A23G 9/22* (2006.01)

(52) U.S. Cl.
CPC ............... *A23B 9/281* (2013.01); *A23G 9/045* (2013.01); *A23G 9/22* (2013.01)

USPC ........................... 62/342; 222/146.6; 222/509

(58) Field of Classification Search
CPC ......... B67D 3/043; A23G 9/04; A23G 9/045; A23G 9/12; A23G 9/281; F25D 31/002
USPC ......... 62/342; 222/146.6, 509, 518, 318, 412, 222/424; 251/335.1
See application file for complete search history.

(56) References Cited

U.S. PATENT DOCUMENTS

| | | | |
|---|---|---|---|
| 3,456,839 A | | 7/1969 | Glisenti |
| 4,711,376 A | * | 12/1987 | Manfroni .................... 222/146.1 |
| 5,016,446 A | | 5/1991 | Fiedler |
| 5,916,248 A | * | 6/1999 | Bravo ............................... 62/68 |
| 5,996,359 A | | 12/1999 | Johnson |
| 6,119,905 A | * | 9/2000 | Cocchi et al. ................. 222/509 |
| 6,182,862 B1 | | 2/2001 | McGill |
| 6,299,025 B1 | * | 10/2001 | Watanabe et al. .......... 222/146.6 |
| 6,553,779 B1 | * | 4/2003 | Boyer et al. .................... 62/342 |

(Continued)

FOREIGN PATENT DOCUMENTS

| | | |
|---|---|---|
| CN | 1891065 A | 1/2007 |
| EP | 1 692 945 A2 | 8/2006 |

(Continued)

*Primary Examiner* — Mohammad M Ali
*Assistant Examiner* — Christopher R Zerphey
(74) *Attorney, Agent, or Firm* — McGlew and Tuttle, P.C.

(57) ABSTRACT

An apparatus comprises a reservoir (2) for containing a food product, an appendage (10) which protrudes from the reservoir (2) and defines a chamber (11) communicating with the reservoir (2), an outlet hole (22) for the food product, the appendage (10) being delimited by a lower surface (12) in which the outlet hole (22) is obtained.

8 Claims, 4 Drawing Sheets

(56) References Cited

U.S. PATENT DOCUMENTS

2004/0020234 A1\* 2/2004 Ugolini .......................... 62/392
2007/0151991 A1 7/2007 Vannini et al.
2012/0234035 A1\* 9/2012 Ugolini .......................... 62/342

FOREIGN PATENT DOCUMENTS

| EP | 1 738 653 A1 | 1/2007 |
| EP | 2 064 957 A1 | 6/2009 |
| WO | 2005/058745 A2 | 6/2005 |

\* cited by examiner

APPARATUS FOR DISPENSING A FOOD PRODUCT

TECHNICAL FIELD

The present invention regards an apparatus for dispensing a food product, particularly a refrigerated fluid or paste food product, for example a water-ice or a milk and/or water based product, such as a shake, a yogurt, a cream or an ice cream.

BACKGROUND ART

Known apparatus for dispensing refrigerated fluid or paste food products comprise a reservoir suitable to contain the food product. Inside the reservoir there is mounted a refrigerating device, suitable to keep the food product cool. A mixing device, arranged inside the reservoir as well, continuously mixes the food product, in order to keep its temperature and composition homogeneous.

The food product can exit from the reservoir through a dispenser device, comprising a tubular body communicating with the reservoir inside which there is mobile an obturator element that, through a lever, can be moved between an open position and a closed position.

A drawback of the known apparatuses is that, in the closed position of the obturator element, a small quantity of food product remains trapped inside the tubular body. As, in the closed position of the obturator element, the tubular body communicates with the reservoir through a narrow passage, or does not communicate at all with the reservoir, the food product trapped in the tubular body cannot mix efficiently with the food product contained in the reservoir. As a consequence, the temperature of the food product trapped in the tubular body increases.

If the food product comprises ice pieces, as in the case of water-ices, the ice pieces of the food product trapped in the tubular body melt due to the increase of temperature. This determines a diminution of the viscosity of the dispensed product.

Furthermore, in the food product which remains inside the tubular body, bacteria can develop or fermentation phenomena can take place, in particular if the food product has milk based formulation, as happens in the case of shakes, of yogurts, of creams or of ice creams. In this case, the dispensed food product can have an undesired flavour or even be harmful for health.

DISCLOSURE OF INVENTION

A scope of the invention is to improve the apparatuses for dispensing food products, in particular refrigerated fluid or paste food products such as milk and/or water based products, for example water-ices, shakes, yogurts, creams or ice creams.

Another scope of the present invention is to provide an apparatus to dispense a food product equipped with a dispenser device, wherein the risks of the food product being stagnant inside the dispenser device are reduced.

A further scope is to provide an apparatus for dispensing a food product, which comprises a reservoir inside which the food product can be efficiently mixed and/or cooled.

In a first aspect of the invention, it is provided for an apparatus comprising a reservoir for containing a food product, an appendage which protrudes from the reservoir and defines a chamber communicating with the reservoir, an outlet hole for the food product, characterized in that the appendage is delimited by an internal surface in which the outlet hole is obtained.

Thanks to the first aspect of the invention, it is possible to limit in a significant manner the stagnation of food product around an obturator element designed to open or close the outlet hole. In facts, the appendage defines, around the obturator element, a relatively wide space wherein the food product can circulate, even though the obturator element is arranged in a closed position. This allows to prevent stagnations of the food product.

The food product contained in the appendage can continuously mix with the product contained in the reservoir, which allows to keep refrigerated the food product even when the obturator element is in the closed position. It is thus avoided that the food product contained in the appendage melt, ferment, or undergo other undesired phenomena. In particular, it is avoided that inside the food product bacteria be generated, even in the case in which the formulation of such a product is milk based.

In a version, the appendage can be dimensioned so that its lower surface completely surrounds the outlet hole.

In this way, it is possible to obtain a particularly wide appendage, inside which the food product can circulate with particular ease, even when the obturator element is in the closed position.

In a version, the reservoir has an at least partially cylindrical lower portion, the appendage communicating with the lower portion of the reservoir through a communication opening being shaped as a circular segment.

In this way, the appendage and the reservoir can communicate with each other through a significantly wide communication opening, which allows the food product to easily pass from the appendage to the reservoir and vice versa, even when the obturator element is in the closed position.

In a second aspect of the invention, it is provided for an apparatus comprising a reservoir for containing a food product, a mixing device arranged internally of the reservoir for mixing the food product conveying the food product from a first end to a second end of the reservoir, characterized in that an upper portion of the reservoir is delimited by a wall inclined towards the inside of the reservoir in order to direct the food product that has interacted with the mixing device from the second end towards the first end.

Thanks to the second aspect of the invention, it is possible to improve the recycling of the food product inside the reservoir. The wall inclined towards the inside in facts makes easier sending the food product which has already interacted with the mixing device towards the first end, so that the food product can newly interact with the mixing device.

BRIEF DESCRIPTION OF THE DRAWINGS

The invention shall be better understood and actuated with reference to the attached drawings, which illustrate an example and non limitative embodiment thereof, wherein.

BEST MODES OF CARRYING OUT THE INVENTION

Figure 1:
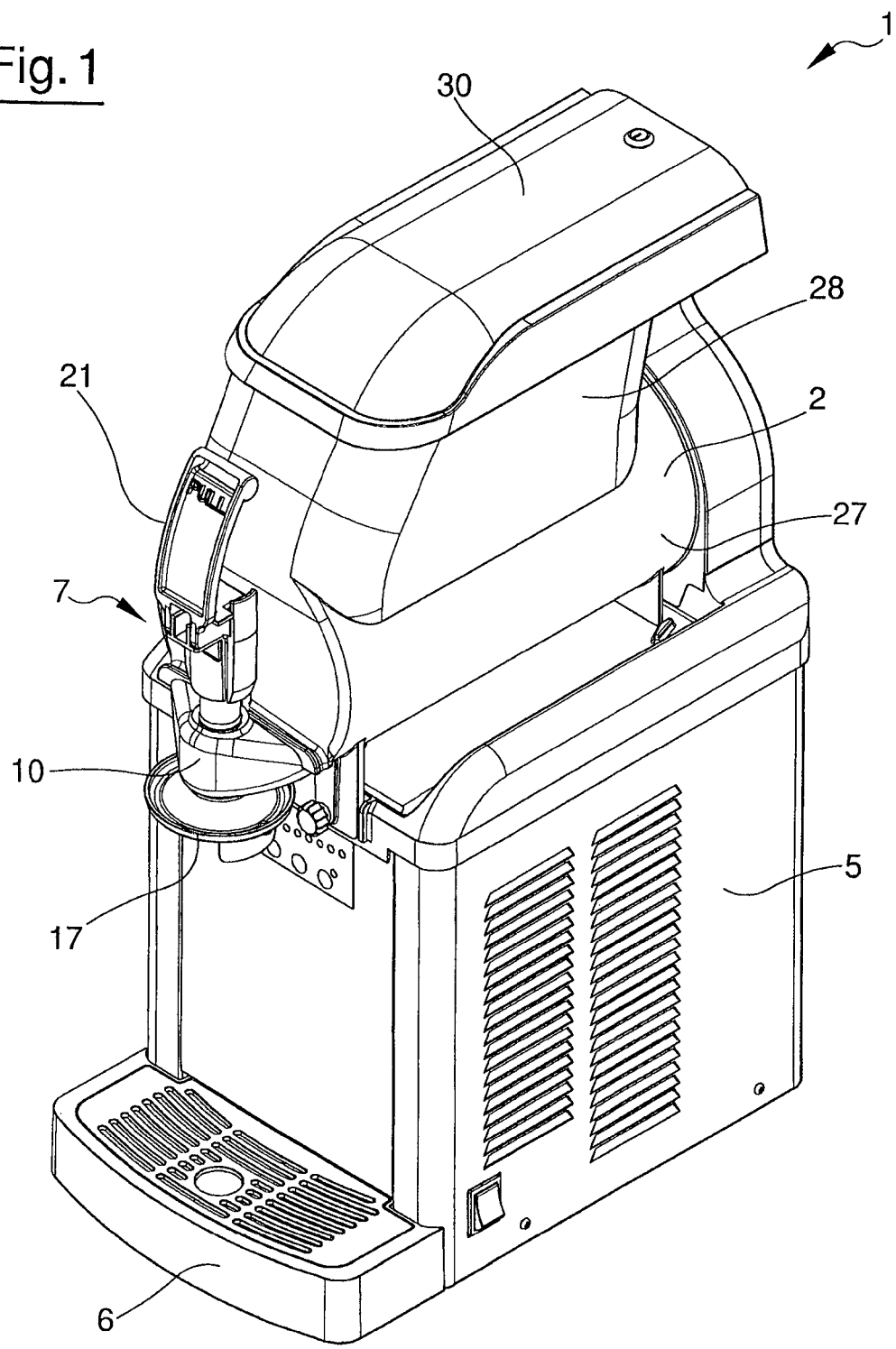
FIG. 1 shows a prospect view of an apparatus for dispensing a food product.

FIG. 1 shows an apparatus 1 for dispensing food products, particularly drinks or other fluid or paste food products possibly refrigerated.

Among the food products that can be dispensed by the apparatus 1, there are milk and/or water based products, as a n example water-ices, shakes, yogurts, creams or ice creams.

The apparatus 1 comprises a reservoir 2 suitable to contain the food product. Inside the reservoir 2 there is arranged a mixing device 3, which can be seen in FIG. 2, which is used to mix the food product in order to maintain in suspension possible solid components, such as ice, fruit or milk particles.

Figure 2:
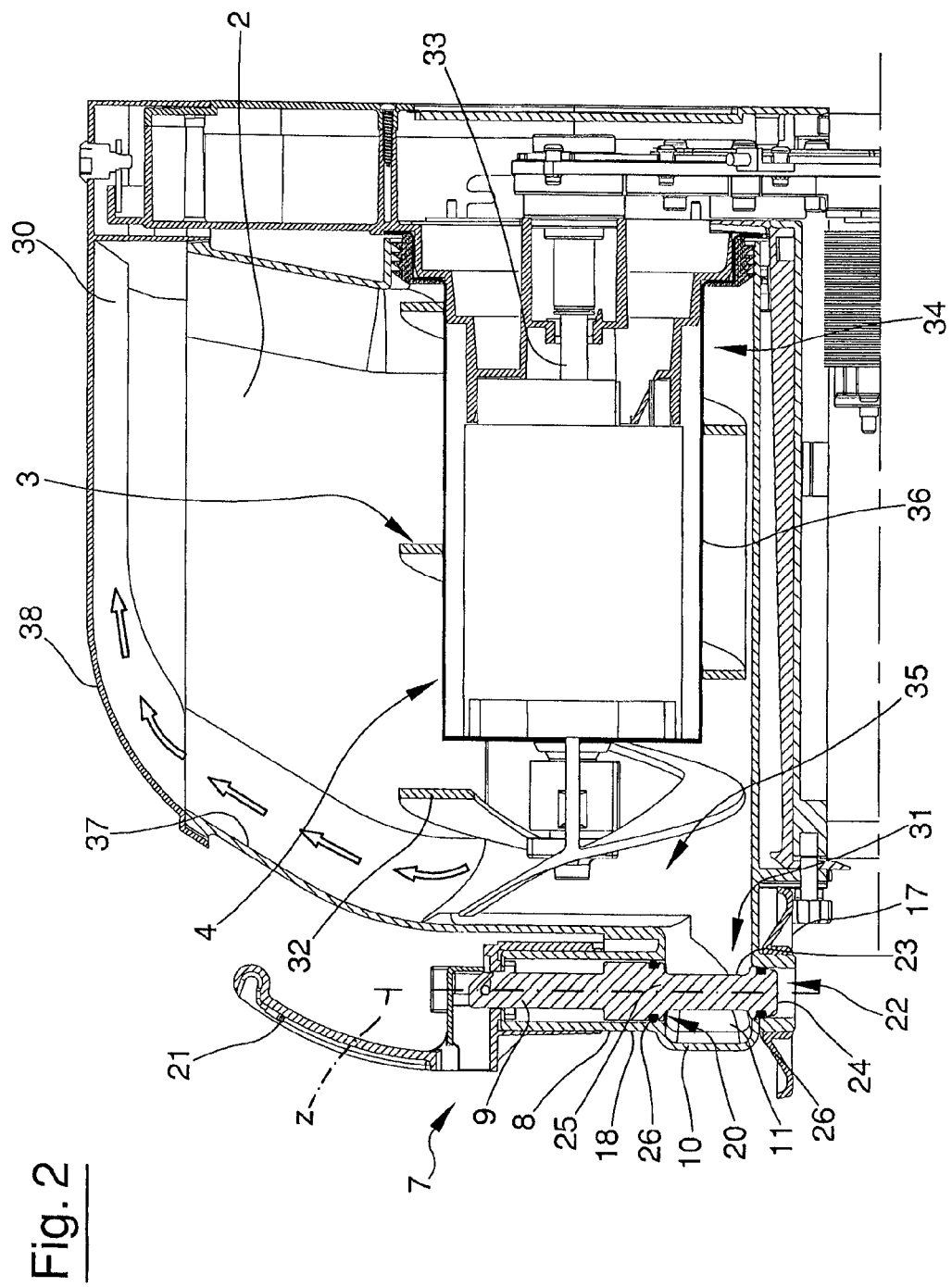
FIG. 2 shows a section view, enlarged and interrupted, cut a long a vertical plane passing by the axis of an obturator element of the apparatus shown in FIG. 1.
Figure 3:
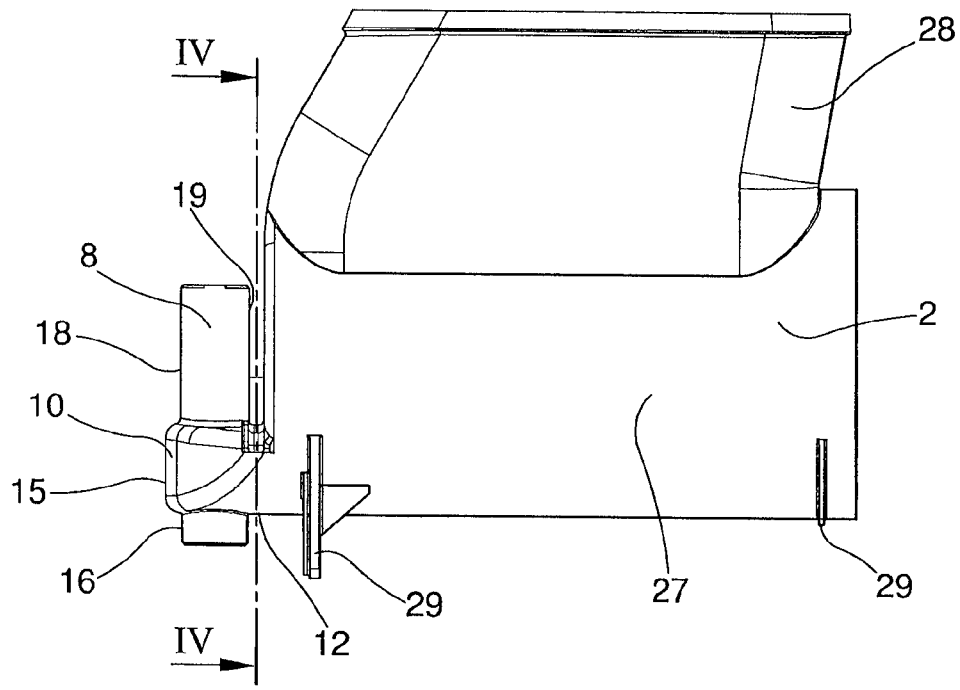
FIG. 3 shows a lateral view of a reservoir of the apparatus shown in FIG. 1.

The apparatus 1 further comprises a cooling device 4, which can be seen in FIG. 2, arranged as well inside the reservoir 2 to cool the food product.

As shown in FIG. 1, the apparatus 1 comprises a case 5 inside which there are housed mechanical and electronic devices necessary for the functioning of the apparatus 1. From the case 5 a base 6 projects, on which a container can be placed, for example a glass, suitable to be filled with the food product. The reservoir 2 is mounted on the top of the case 5.

The apparatus 1 further comprises a dispenser device 7 for dispensing the food product inside the container placed on the base 6. The dispenser device 7 comprises a body 8 extending along a longitudinal axis Z which, in the example shown in FIG. 2, is vertical. Inside the body 8 there is mobile an obturator element 9, shown in FIG. 2 as well. In particular, the obturator element 9 is mobile between a closed position, wherein the food product cannot exit from the dispenser device 7, and an open position, wherein the food product can exit from the dispenser device 7 to fill the container.

The apparatus 1 comprises an appendage 10 which projects from the reservoir 2 in a way as to be operatively positioned above the base 6. Internally of the appendage 10 there is defined a chamber 11 which communicates with the reservoir 2 and contains the same food product contained in the reservoir 2.

Figure 6:
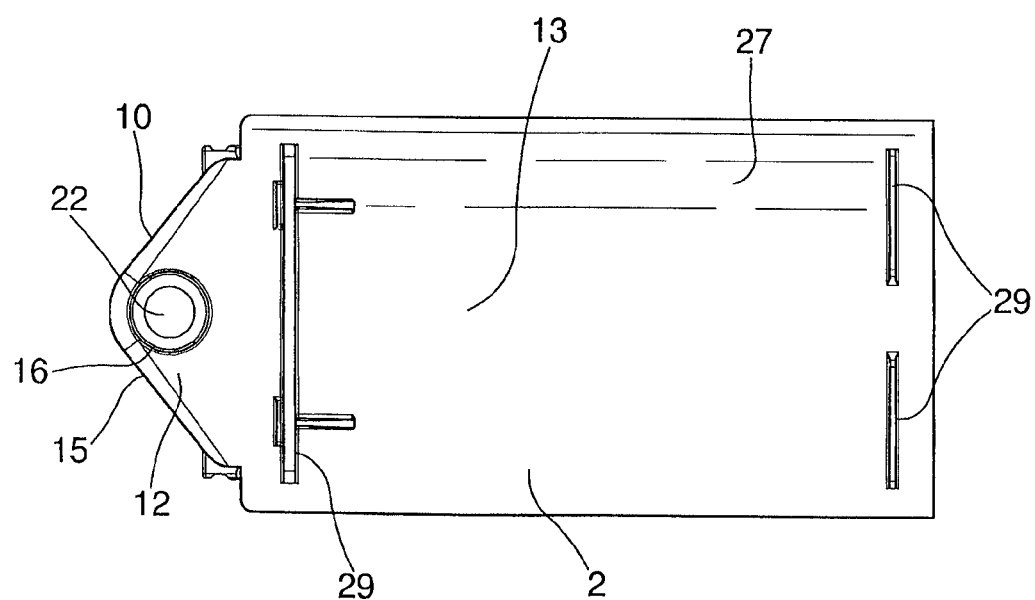
FIG. 6 shows a view from the bottom of the reservoir in FIG. 3.

As shown in FIG. 6, the appendage 10 is delimited by a lower surface 12 that, in the illustrated example, is contiguous to a further lower surface 13 delimiting the reservoir 2. The lower surface 12 can be at least partially shaped as a portion of cylindrical surface, even though various geometrical shapes can be adopted.

In the lower surface 12 there is obtained an outlet hole 22, for example circular shaped, which, when it is open, enables the food product to exit from the appendage 10 to fill the container.

In the illustrated example, the lower surface 12 completely surrounds the outlet hole 22, that is, extends around the outlet hole 22 for 360°.

From the outlet hole 22 a tubular portion 16 can project, arranged about the longitudinal axis Z under the appendage 10. The tubular portion 16 defines an outlet duct through which the food product is supplied. To the tubular portion 16 can be fixed, in a removable manner, a protection element 17 shown in FIGS. 1 and 2. The protection element 17 can be shaped as a disk having a central hole and is suitable to prevent possible condensation droplets present on the surface of the reservoir 2 or of the appendage 10 from falling in the container.

In the represented example, the tubular portion 16 has a cylindrical shape, but it is possible to use different shapes.

Figure 5:
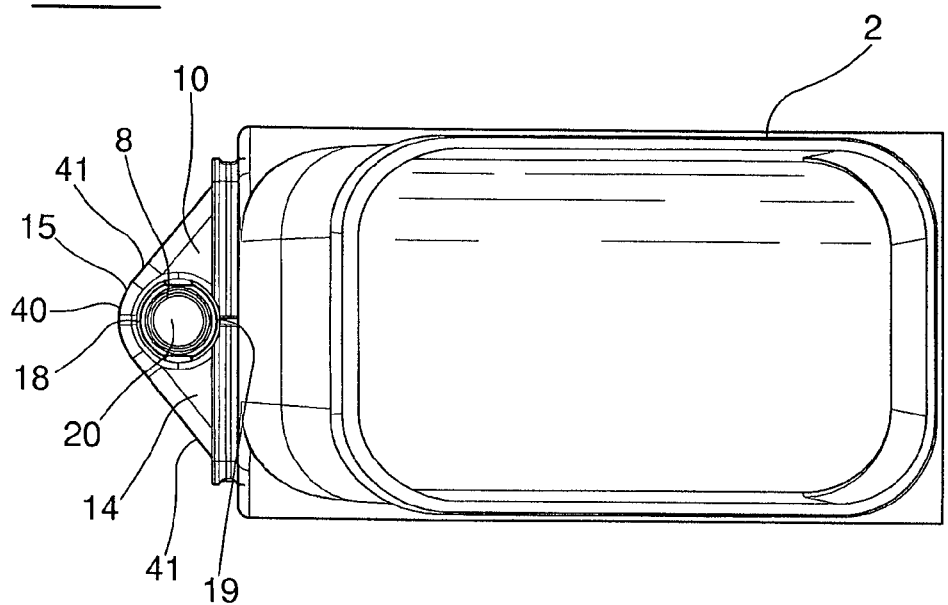
FIG. 5 shows a top view of the reservoir in FIG. 3.

Furthermore, the appendage 10 is delimited by an upper surface 14, shown in FIG. 5, which can be substantially flat, for example arranged perpendicularly to the longitudinal axis Z. On the upper surface 14 ends the body 8, which is delimited, at the opposite part with respect to the reservoir 2, by a portion of surface 18.

The body 8 can have a tubular shape, in such a case the body is delimited, further than by the portion of surface 18, also by a further portion of surface 19, facing the reservoir 2. Nevertheless it is possible to provide for other shapes of the body 8 that could, for example, be obtained in contact with the reservoir 2.

The body 8 ends into the appendage 10 at an opening 20. In the represented example, the body 8 has, at least close to the appendage 10, the shape of a cylinder extending about the longitudinal axis Z. As a consequence, the opening 20 is shaped as a circular hole. Nevertheless, other geometries are possible.

The opening 20 can be entirely surrounded by the upper surface 14 of the appendage 10.

The body 8 and the tubular portion 16 can be aligned along the longitudinal axis Z. The body 8 and the tubular portion 16 can have dimensions, measured transversely with respect to the longitudinal axis Z, equal or different to each other.

The body 8 and the tubular portion 16 can be shaped integrally with the reservoir 2 and the appendage 10, for example through moulding of a plastic material.

As shown in FIG. 2, the obturator element 9 can be shaped as a stem at least partially housed internally to the body 8 and sliding in a direction parallel to the longitudinal axis Z. A control member 21, for example shaped as a lever, can be used to move the obturator element 9 parallel to the longitudinal axis Z.

The obturator element 9 can comprise a central portion 23 interposed between a lower enlarged portion 24 and an upper enlarged portion 25. The lower enlarged portion 24 and the upper enlarged portion 25 are each provided with a seal element 26, for example an O-ring type joint. The seal elements 26 are arranged to engage corresponding surfaces that delimit respectively the opening 20 and the outlet hole 22, in the closed position of the obturator element 9.

As can be seen in the figures, the appendage 10 protrudes from the portion of surface 18 of the body 8. In other words, the appendage 10 is delimited, around the longitudinal axis Z, by a lateral surface 15 which is not arranged aligned with the portion of surface 18 of the body 8, but is protruding with respect to such a portion of surface. As a consequence, the chamber 11 defined internally of the appendage 10 has a volume greater than the volume it would have if the lateral surface 15 was aligned with the portion of surface 18.

The tubular portion 16 and the body 8 communicate with a central region of the appendage 10. The appendage 10 further comprises two peripheral regions arranged at the sides of the central region.

As shown in FIG. 5, the lateral surface 15 of the appendage 10 can have a central portion 40 having a concave shape. At the sides of the central portion 40, the lateral surface 15 can have two peripheral portions 41 substantially flat, in a way as to give the appendage 10, in a plan view, an approximately triangular profile. The central portion 40 can have a curvature radius greater than the radius of the body 8, in the case this latter is cylindrical.

In the represented example, the reservoir 2 comprises a lower portion 27, that can have the shape of a portion of cylinder, extending for example along a horizontal axis. From the lower portion 27 project a plurality of brackets 29, which serve to fix the reservoir 2 to the case 5.

The regions of the appendage 10 delimited by the peripheral portions 41 link the central region of the appendage 10 to the cylindrical surface of the lower portion 27.

The reservoir 2 further comprises an upper portion 28 arranged above the lower portion 27. The upper portion 28 is equipped with an upper opening that can be closed by a lid 30, shown in FIGS. 1 and 2.

Figure 4:
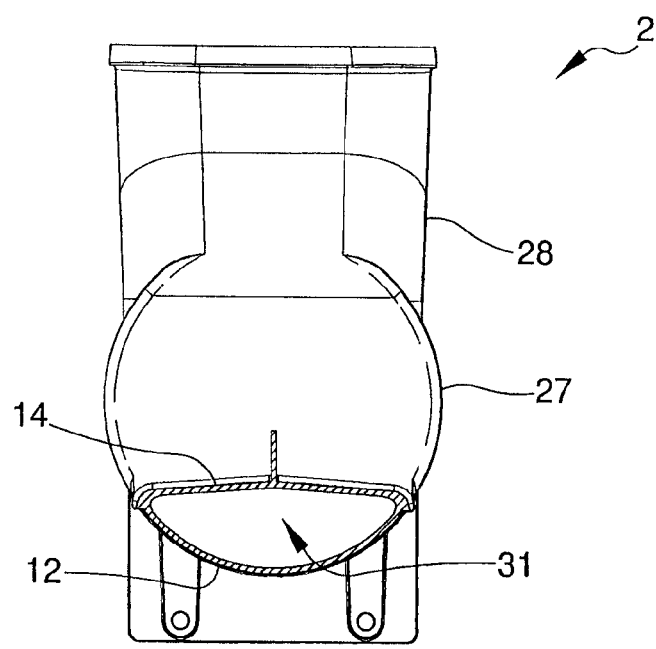
FIG. 4 shows a section view taken along the plane IV-IV in FIG. 3.

The appendage 10 communicates with the reservoir 2 through a communication opening 31 shown in FIG. 4 which, in the represented example, has approximately the shape of a circular segment. In fact, the communication opening 31 is delimited at the lower part by the lower surface 12 of the appendage 10 and at the upper part by the upper surface 14 of the appendage 10. As the lower surface 12 can be substantially cylindrical and the upper surface 14 can be substantially flat, the communication opening 31 can have approximately the shape of a circular segment. A communication opening of this type is relatively wide, which allows the food product to easily pass from the reservoir 2 to the appendage 10 and vice versa.

As shown in FIG. 2, the mixing device 3 comprises a helix mixer 32 fixed to a shaft 33 which can be rotated by means of an actuation device positioned in the case 5. The helix mixer 32 is designed in a way as to convey the food product from a first end 34 of the reservoir 2 towards a second end 35 of the reservoir 2. The first end 34 is distal to the appendage 10, while the second end 35 is proximal to the appendage 10.

The cooling device 4 can comprise a cylindrical evaporator 36 of known type, the cylindrical evaporator 36 being interposed between the shaft 33 and the helix mixer 32.

The upper portion 28 of the reservoir 2 is delimited, in proximity of the second end 35, by a wall 37 inclined towards the inside of the reservoir 2. The wall 37 enables the operating fluid, conveyed by the helix mixer 32 towards the second end 35 of the reservoir 2, to be easily directed towards the first end 34, as indicated by the arrows in FIG. 2, so as to newly interact with the helix mixer 32. To such end, the lid 30 can be provided, above the wall 37, with a curved portion 38, which allows the food product to change direction in a gradual manner. In this way undesired stagnations of the food product in the upper angles of the reservoir 2 are avoided.

During the functioning, the operator introduces in the reservoir 2 the desired food product through the upper opening from which the lid 30 has been temporarily removed.

The mixing device 3 and the cooling device 4 maintain the food product mixed and at the desired temperature. In particular, the helix mixer 32, rotating around an axis of the shaft 33, pushes the food product from the first end 34 towards the second end 35 of the reservoir 2. The food product that is in proximity of the second end 35 is then pushed towards the top and thus goes back towards the first end 34. In this step, the food product moves tangentially to the inclined wall 37 and to the curved portion 38, which make the flow of the food product easier and enable to avoid stagnation phenomena.

The obturator element 9 is normally in the closed position shown in FIG. 2, wherein the lower enlarged portion 24 engages the internal surface of the tubular portion 16 to prevent the food product contained in the appendage 10 from exiting through the outlet hole 22 by gravity. Instead the upper enlarged portion 25 of the obturator element 9 engages the internal surface of the body 8 in order to prevent the food product from going back up in the body 8. The central portion 23 is entirely contained in the appendage 10.

In this condition, the food products thus remains confined internally of the reservoir 2 and to the appendage 10.

Thanks to the dimensions of the appendage 10 and of the communication opening 31, the food product, moved by the mixing device 3, can easily pass from the reservoir 2 into the appendage 10 and vice versa, without stagnating inside the appendage 10.

When the operator wants to fill a container with the food product, the container is positioned under the dispenser device 7 placing it on the base 6 or holding it in an operator's hand. Successively, the operator manually actuates the control member 21 to move the obturator element 9 from the closed position into the open position. In particular, the operator can draw towards himself the control member 21. The obturator element 9 is moved upwards along the longitudinal axis Z, so that the lower enlarged portion 24 disengages from the tubular portion 16 and is received in the appendage 10. The outlet hole 22 is thus opened to enable the food product to be poured in the underlying container. This latter first receives the food product contained in the appendage 10 and successively a certain quantity of food product coming from the reservoir 2. Thanks to the continuous recycling of the food product in the reservoir 2 and in the appendage 10, the whole food product poured in the container has an homogeneous composition and an uniform temperature. In this way it is avoided that the first part of the food product poured in the container, coming from the appendage 10, is more liquid than the food product coming from the reservoir 2 or contains undesired bacteria, even if a relatively long period of time elapses between two successive supplies.

The invention claimed is:

1. An apparatus for dispensing a food product, particularly a refrigerated fluid or paste product, the apparatus comprising:
    a reservoir comprising a reservoir interior;
    a cooling device arranged in said reservoir interior;
    a mixing device arranged in said reservoir interior;
    a dispensing device arranged adjacent to said reservoir;
    an obturator element comprising a longitudinal axis, said obturator element being connected to said dispensing device, said dispensing device comprising an upper surface, an appendage and a lower surface, said upper surface, said appendage and said lower surface being integrally connected, said appendage being located at a radially spaced location from said upper surface and said lower surface with respect to said longitudinal axis, at least said appendage defining a chamber, said chamber being in communication with said reservoir, said chamber defining a space in which the food product can flow;
    a tubular body connected to said upper surface, said tubular body receiving at least a portion of said obturator element;
    a tubular portion extending from said lower surface, below said appendage, to define a channel through which the food product is dispensed.

2. An apparatus according to claim 1, wherein said appendage comprises a concave lateral surface, said concave lateral surface having an approximately triangular shape.

3. An apparatus according to claim 1, wherein said concave lateral surface of the appendage has a central concave portion having a curvature radius greater than a curvature radius of said tubular body.

4. An apparatus according to claim 3, wherein said concave lateral surface of the appendage has end portions, substantially flat and located on sides of said central concave portion.

5. An apparatus for dispensing a food product, particularly a refrigerated fluid or paste product, the apparatus comprising:
    a reservoir comprising a reservoir interior;
    a cooling device arranged in said reservoir interior;
    a mixing device arranged in said reservoir interior;

a dispensing device arranged opposite said reservoir, said dispensing device comprising a tubular body and an appendage, said tubular body being integrally connected to said dispensing device, said tubular body comprising an outer tubular body surface and an inner tubular body surface, said appendage comprising an outer appendage surface and an inner appendage surface, at least said appendage defining a chamber, said chamber being in communication with said reservoir, said chamber defining a space in which the food product can flow;

an obturator element comprising a longitudinal axis, said obturator element being connected to said dispensing device, said inner appendage surface being located at a radially outwardly spaced location from said outer tubular body surface with respect to said longitudinal axis.

6. An apparatus according to claim 5, wherein said inner appendage surface comprises a concave lateral surface, said concave lateral surface having an approximately triangular shape, said outer tubular body surface being located at a first distance from said longitudinal axis, said inner appendage surface being located at a second distance from said longitudinal axis, said first distance being less than said second distance, wherein said appendage is not aligned with said tubular body.

7. An apparatus according to claim 6, further comprising:
a tubular portion extending from a lower surface, below said appendage, to define a channel through which the food product is dispensed, wherein said concave lateral surface of the appendage has a central concave portion having a curvature radius greater than a curvature radius of said tubular body, said tubular body being integrally connected to said appendage.

8. An apparatus according to claim 7, wherein said concave lateral surface of the appendage has end portions, substantially flat and located on sides of said central concave portion.

* * * * *